United States Patent Office 3,341,524
Patented Sept. 12, 1967

3,341,524
2-METHYL-Δ²-CORTICOIDS
Albert Bowers and James C. Orr, Mexico City, Mexico, assignors, by mesne assignments, to Syntex Corporation, a corporation of Panama
No Drawing. Filed Sept. 15, 1961, Ser. No. 138,265
The portion of the term of the patent subsequent to Oct. 2, 1979, has been disclaimed
26 Claims. (Cl. 260—239.55)

The present invention relates to novel cyclopentanophenanthrene derivatives and to a process for the production thereof.

More particularly the present invention relates to 2-methyl-Δ²-derivatives of cortical hormones.

The novel compounds of the present invention which are powerful anti-inflammatory agents with low catabolic activities and which also exhibit glycogenic, thymolytic, anti-estrogenic and anti-gonadotrophic activities, are represented by the following formulas:

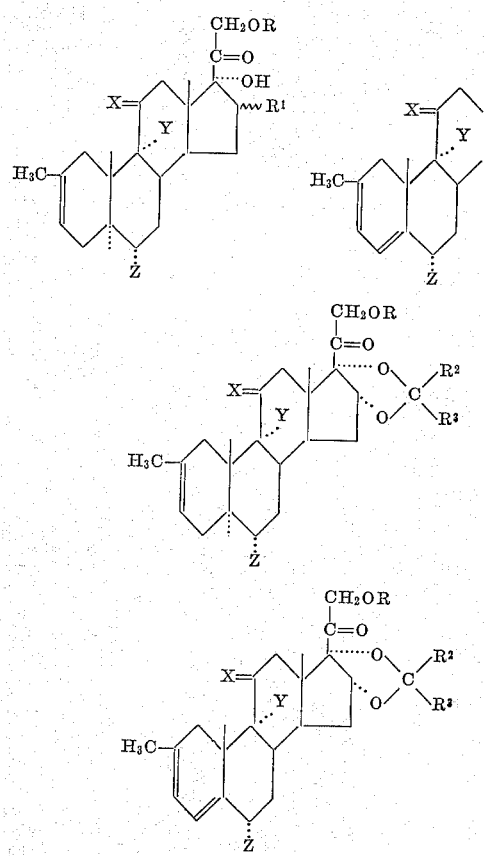

In the above formulas X represents β-hydroxy or keto; Y represents hydrogen, fluorine or chlorine; Z represents hydrogen, fluorine, chlorine or methyl; R represents hydrogen or a hydrocarbon carboxylic acyl group of less than 12 carbon atoms; $R^1$ represents hydrogen, α-methyl, β-methyl, α-hydroxy or α-hydrocarbon carboxylic acyloxy of less than 12 carbon atoms; and $R^2$ and $R^3$ each represent hydrogen or the residue of a hydrocarbon radical containing up to 8 carbon atoms of straight, branched, cyclic or mixed aliphatic-cyclic chain, saturated or unsaturated and including aromatic groups.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process illustrated by the following equation:

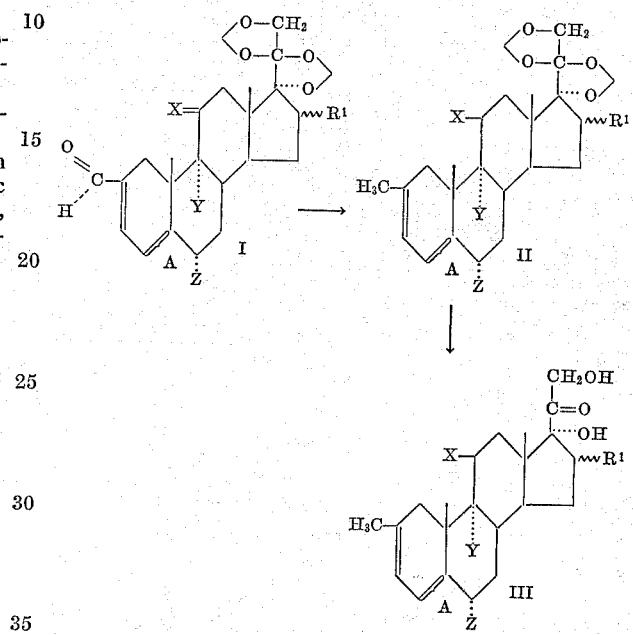

In the above formulas X, Y, Z and $R^1$ have the same meaning previously set forth; A represents a double bond or a saturated linkage between C-4 and C-5.

In practicing the process just outlined the starting compound (I) which is 2-formyl-17,20; 20,21-bismethylenedioxy-Δ²-allopregnen or a 2-formyl-17,20; 20,21-bismethylenedioxy-Δ²,⁴-pregnadien derivative (obtained in accordance with our copending U.S. patent application Ser. No. 138,267 filed of even date herewith) now Pat. No. 3,086,013 is treated with ethanedithiol in the presence of an acid such as a saturated solution of hydrogen chloride in acetic acid, affording the corresponding dithioacetal, which upon reaction with Raney nickel in a suitable solvent, preferably acetone, at reflux temperature for a period of time of the order of 6 hours, furnishes the corresponding 2-methyl-17,20; 20,21-bismethylenedioxy derivative (II). Hydrolysis of the 17,20; 20,21-bismethylenedioxy group in an acid medium such as formic acid furnishes the corresponding 2-methyl-17α,21-diol-20-one derivative (III).

The above obtained compounds with a primary hydroxyl group such as the 21-hydroxyl and/or a secondary hydroxyl such as the C-16α-hydroxyl are conventionally acylated in pyridine with an acylating agent, as for example acetic anhydride or propionic anhydride, affording the corresponding mono- or di-acylates.

The above mentioned compounds with a hydroxyl group at C-16α and at C-17α are converted into the 16α, 17α-cyclic acetal or 16α,17α-cyclic ketal by reaction with an aldehyde or ketone such as acetone, formaldehyde, paraldehyde, acetaldehyde, acetophenone, benzophenone, methyl ethyl ketone, diethyl ketone and other similar aldehydes and ketones in the presence of an acid catalyst such as perchloric acid or hydrochloric acid.

The following specific examples serve to illustrate but are not intended to limit the scope of the present invention:

Example I

A solution of 5 g. of 2-formyl-16α-methyl-6α-fluoro-17,20; 20,21-bismethylenedioxy-Δ²-allopregnen-11-one in 100 cc. of glacial acetic acid containing 5 cc. of ethanedithiol and 4 cc. of a saturated solution of hydrogen chloride in acetic acid was allowed to stand at room temperature for 4 hours. Water was added and the resulting mixture was saturated with ethyl acetate. The extract was washed with a 5% aqueous sodium bicarbonate solution, water, dried over sodium sulfate and evaporated to dryness. Recrystallization from ether-hexane afforded the cycloethylene dithioacetal of the starting compound.

A solution of 4 g. of the above dithioacetal dissolved in 3 lt. of acetone was boiled under reflux for 6 hours with 50 g. of Raney nickel. The metal was removed by filtration and washed well with hot acetone. The filtrate was evaporated to dryness, dissolved in chloroform and washed with dilute hydrochloric acid, sodium carbonate solution and water. Drying, evaporation and crystallization of the residue from acetone-hexane furnished 2,16α-dimethyl-6α-fluoro-17,20; 20,21-bismethylenedioxy-Δ²-allopregnen-11-one.

The following starting compounds were treated by the above procedure, giving the products hereinafter set forth:

| Starting Compound | Product |
|---|---|
| 2-formyl-16α-methyl-6α,9α-difluoro-17,20; 20,21-bismethylenedioxy-Δ²-allopregnen-11-one. | 2,16α-dimethyl-6α,9α-difluoro-17,20; 20,21-bismethylenedioxy-Δ²-allopregnen-11-one. |
| 2-formyl-16α-methyl-6α-fluoro-9α-chloro-17,20; 20,21-bismethylenedioxy-Δ²-allopregnen-11-one. | 2,16α-dimethyl-6α-fluoro-9α-chloro-17,20; 20,21-bismethylenedioxy-Δ²-allopregnen-11-one. |
| 2-formyl-16α-methyl-6α-fluoro-17,20; 20,21-bismethylenedioxy-Δ²-allopregnen-11β-ol. | 2,16α-dimethyl-6α-fluoro-17,20; 20,21-bismethylenedioxy-Δ²-allopregnen-11β-ol. |
| 2-formyl-16α-methyl-6α,9α-difluoro-17,20; 20,21-bismethylenedioxy-Δ²-allopregnen-11β-ol. | 2,16α-dimethyl-6α,9α-difluoro-17,20; 20,21-bismethylenedioxy-Δ²-allopregnen-11β-ol. |
| 2-formyl-16α-methyl-6α-fluoro-9α-chloro-17,20; 20,21-bismethylenedioxy-Δ²-allopregnen-11β-ol. | 2,16α-dimethyl-6α-fluoro-9α-chloro-17,20; 20,21-bismethylenedioxy-Δ²-allopregnen-11β-ol. |
| 2-formyl-16β-methyl-6α,9α-difluoro-17,20; 20,21-bismethylenedioxy-Δ²-allopregnen-11-one. | 2,16β-dimethyl-6α,9α-difluoro-17,20; 20,21-bismethylenedioxy-Δ²-allopregnen-11-one. |
| 2-formyl-16β-methyl-6α,9α-difluoro-17,20; 20,21-bismethylenedioxy-Δ²-allopregnen-11β-ol. | 2,16β-dimethyl-6α,9α-difluoro-17,21; 20,21-bismethylenedioxy-Δ²-allopregnen-11β-ol. |
| 2-formyl-6α,16β-dimethyl-17,20; 20,21-bismethylenedioxy-Δ²-allopregnen-11-one. | 2,6α,16β-trimethyl-17,20; 20,21-bismethylenedioxy-Δ²-allopregnen-11-one. |
| 2-formyl-6α,16β-dimethyl-17,20; 20,21-bismethylenedioxy-Δ²-allopregnen-11β-ol. | 2,6α,16β-trimethyl-17,20; 20,21-bismethylenedioxy-Δ²-allopregnen-11β-ol. |
| 2-formyl-6α-chloro-9α-fluoro-17,20; 20,21-bismethylenedioxy-Δ²-allopregnen-16α-ol-11-one. | 2-methyl-6α-cholor-9α-fluoro-17,20; 20,21-bismethylenedioxy-Δ²-allopregnen-16α-ol-11-one. |
| 2-formyl-6α-chloro-9α-fluoro-17,20; 20,21-bismethylenedioxy-Δ²-allopregnen-11β,16α-diol. | 2-methyl-6α-chloro-9α-fluoro-17,20; 20,21-bismethylenedioxy-Δ²-allopregnen-11β,16α-diol. |
| 2-formyl-9α-fluoro-17,20; 20,21-bismethylenedioxy-Δ²-allopregnen-11β,16α-diol. | 2-methyl-9α-fluoro-17,20; 20,21-bismethylenedioxy-Δ²-allopregnen-11β,16α-diol. |
| 2-formyl-9α-fluoro-17,20; 20,21-bismethylenedioxy-Δ²-allopregnen-16α-ol-11-one. | 2-methyl-9α-fluoro-17,20; 20,21-bismethylenedioxy-Δ²-allopregnen-16α-ol-11-one. |
| 2-formyl-17,20; 20,21-bismethylenedioxy-Δ²-allopregnen-11β-ol. | 2-methyl-17,20; 20,21-bismethylenedioxy-Δ²-allopregnen-11β-ol. |
| 2-formyl-6α-methyl-17,20; 20,21-bismethylenedioxy-Δ²-allopregnen-11β,16α-diol. | 2,6α-dimethyl-17,20; 20,21-bismethylenedioxy-Δ²-allopregnen-11β,16α-diol. |
| 2-formyl-16α-methyl-6α,9α-difluoro-17,20; 20,21-bismethylenedioxy-Δ²,⁴-pregnadien-11β-ol. | 2,16α-dimethyl-6α,9α-difluoro-17,20; 20,21-bismethylenedioxy-Δ²,⁴-pregnadien-11β-ol. |
| 2-formyl-16α-methyl-6α-fluoro-9α-chloro-17,20; 20,21-bismethylenedioxy-Δ²,⁴-pregnadien-11β-ol. | 2,16α-dimethyl-6α-fluoro-9α-chloro-17,20; 20,21-bismethylenedioxy-Δ²,⁴-pregnadien-11β-ol. |
| 2-formyl-16β-methyl-6α,9α-difluoro-17,20; 20,21-bismethylenedioxy-Δ²,⁴-pregnadien-11β-ol. | 2,16β-dimethyl-6α,9α-difluoro-17,20; 20,21-bismethylenedioxy-Δ²,⁴-pregnadien-11β-ol. |
| 2-formyl-6α,16β-dimethyl-17,20; 20,21-bismethylenedioxy-Δ²,⁴-pregnadien-11β-ol. | 2,6α,16β-trimethyl-17,20; 20,21-bismethylenedioxy-Δ²,⁴-pregnadien-11β-ol. |
| 2-formyl-6α-chloro-9α-fluoro-17,20; 20,21-bismethylenedioxy-Δ²,⁴-pregnadien-11β,16α,diol. | 2-methyl-6α-chloro-9α-fluoro-17,20; 20,21-bismethylenedioxy-Δ²,⁴-pregnadien-11β,16α-diol. |
| 2-formyl-9α-fluoro-17,20; 20,21-bismethylenedioxy-Δ²,⁴-pregnadien-11β,16α-diol. | 2-methyl-9α-fluoro-17,20; 20,21-bismethylenedioxy-Δ²,⁴-pregnadien-11β,16α-diol. |
| 2-formyl-16α-methyl-6α-fluoro-17,20; 20,21-bismethylenedioxy-Δ²,⁴-pregnadien-11-one. | 2,16α-dimethyl-6α-fluoro-17,20; 20,21-bismethylenedioxy-Δ²,⁴-pregnadien-11-one. |
| 2-formyl-16α-methyl-6α-fluoro-17,20; 20,21-bismethylenedioxy-Δ²,⁴-pregnadien-11β-ol. | 2,16α-dimethyl-6α-fluoro-17,20; 20,21-bismethylenedioxy-Δ²,⁴-pregnadien-11β-ol. |
| 2-formyl-16α-methyl-6α-fluoro-9α-chloro-17,20; 20,21-bismethylenedioxy-Δ²,⁴-pregnadien-11-one. | 2,16α-dimethyl-6α-fluoro-9α-chloro-17,20; 20,21-bismethylenedioxy-Δ²,⁴-pregnadien-11-one. |
| 2-formyl-16α-methyl-6α,9α-difluoro-17,20; 20,21-bismethylenedioxy-Δ²,⁴-pregnadien-11-one. | 2,16α-dimethyl-6α,9α-difluoro-18,20; 20,21-bismethylenedioxy-Δ²,⁴-pregnadien-11-one. |
| 2-formyl-16β-methyl-6α,9α-difluoro-17,20; 20,21-bismethylenedioxy-Δ²,⁴-pregnadien-11-one. | 2,16β-dimethyl-6α,9α-difluoro-17,20; 20,21-bismethylenedioxy-Δ²,⁴-pregnadien-11-one. |
| 2-formyl-6α,16β-dimethyl-17,20; 20,21-bismethylenedioxy-Δ²,⁴-pregnadien-11-one. | 2,6α,16β-trimethyl-17,20; 20,21-bismethylenedioxy-Δ²,⁴-pregnadien-11-one. |
| 2-formyl-6α-chloro-9α-fluoro-17,20; 20,21-bismethylenedioxy-Δ²,⁴-pregnadien-16α-ol-11-one. | 2-methyl-6α-chloro-9α-fluoro-17,20; 20,21-bismethylenedioxy-Δ²,⁴-pregnadien-16α-ol-11-one. |
| 2-formyl-9α-fluoro-17,20; 20,21-bismethylenedioxy-Δ²,⁴-pregnadien-16α-ol-11-one. | 2-methyl-9α-fluoro-17,20; 20,21-bismethylenedioxy-Δ²,⁴-pregnadien-16α-ol-11-one. |
| 2-formyl-17,20; 20,21-bismethylenedioxy-Δ²,⁴-pregnadien-11β-ol. | 2-methyl-17,20; 20,21-bismethylenedioxy-Δ²,⁴-pregnadien-11β-ol. |
| 2-formyl-6α-methyl-17,20; 20,21-bismethylenedioxy-Δ²,⁴-pregnadien-11β,16α-diol. | 2,6α-dimethyl-17,20; 20,21-bismethylenedioxy-Δ²,⁴-pregnadien-11β,16α-diol. |

Example II 1 g. of 2.16α - dimethyl - 6α - fluoro - 17,20; 20,21-bismethylenedioxy-Δ²-allopregnen-11-one was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 2,16α-dimethyl-6α-fluoro-Δ²-allopregnen-17α,21-diol-11,20-dione.

By the sam eprocedure there were treated the starting compounds listed below affording the corresponding products hereinafter set forth.

| Starting Compound | Product |
|---|---|
| 2,16α-dimethyl-6α,9α-difluoro-17,20; 20,21-bismethylenedioxy-Δ²-allopregnen-11-one. | 2,16α-dimethyl-6α,9α-difluoro-Δ²-allopregnen-17α,21-diol-11,20-dione. |
| 2,16α-dimethyl-6α-fluoro-9α-chloro-17,20; 20,21-bismethylenedioxy-Δ²-allopregnen-11-one. | 2,16α-dimethyl-6α-fluoro-9α-chloro-Δ²-allopregnen-17α,21-diol-11,20-dione. |
| 2,16α-dimethyl-6α-fluoro-17,20; 20,21-bismethylenedioxy-Δ²-allopregnen-11β-ol. | 2,16α-dimethyl-6α-fluoro-Δ²-allopregnen-11β,17α,21-triol-20-one. |
| 2,16α-dimethyl-6α,9α-difluoro-17,20; 20,21-bismethylenedioxy-Δ²-allopregnen-11β-ol. | 2,16α-dimethyl-6α,9α-difluoro-Δ²-allopregnen-11β,17α,21-triol-20-one. |
| 2,16α-dimethyl-6α-fluoro-9α-chloro-17,20; 20,21-bismethylenedioxy-Δ²-allopregnen-11β-ol. | 2,16α-dimethyl-6α-fluoro-9α-chloro-Δ²-allopregnen-11β,17α,21-triol-20-one. |
| 2,16β-dimethyl-6α,9α-difluoro-17,20; 20,21-bismethylenedioxy-Δ²-allopregnen-11-one. | 2,16β-dimethyl-6α,9α-difluoro-Δ²-allopregnen-17α,21-diol-11,20-dione. |
| 2,16β-dimethyl-6α,9α-difluoro-17,20; 20,21-bismethylenedioxy-Δ²-allopregnen-11β-ol. | 2,16β-dimethyl-6α,9α-difluoro-Δ²-allopregnen-11β,17α,21-triol-20-one. |
| 2,6α,16β-trimethyl-17,20; 20,21-bismethylenedioxy-Δ²-allopregnen-11-one. | 2,6α,16β-trimethyl-Δ²-allopregnen-17α,21-diol-11,20-dione. |
| 2,6α,16β-trimethyl-17,20; 20,21-bismethylenedioxy-Δ²-allopregnen-11β-ol. | 2,6α,16β-trimethyl-Δ²-allopregnen-11β,17α,21-triol-20-one. |
| 2-methyl-6α-chloro-9α-fluoro-17,20; 20,21-bismethylenedioxy-Δ²-allopregnen-16α-ol-11-one. | 2-methyl-6α-chloro-9α-fluoro-Δ²-allopregnen-16α,17α,21-triol-11,20-dione. |
| 2-methyl-6α-chloro-9α-fluoro-17,20; 20,21-bismethylenedioxy-Δ²-allopregnen-11β,16α-diol. | 2-methyl-6α-chloro-9α-fluoro-Δ²-allopregnen-11β,16α,17α,21-tetrol-20-one. |
| 2-methyl-9α-fluoro-17,20; 20,21-bismethylenedioxy-Δ²-allopregnen-11β,16α-diol. | 2-methyl-9α-fluoro-Δ²-allopregnen-11β,16α,17α,21-tetrol-20-one. |
| 2-methyl-9α-fluoro-17,20; 20,21-bismethylenedioxy-Δ²-allopregnen-16α-ol-11-one. | 2-methyl-9α-fluoro-Δ²-allopregnen-16α,17α,21-triol-11,20-dione. |
| 2-methyl-17,20; 20,21-bismethylenedioxy-Δ²-allopregnen-11β-ol. | 2-methyl-Δ²-allopregnen-11β,17α,21-triol-20-one. |
| 2,6α-dimethyl-11,20; 20,21-bismethylenedioxy-Δ²-allopregnen-11β,16α-diol. | 2,6α-dimethyl-Δ²-allopregnen-11β,16α,17α,21-tetrol-20-one. |
| 2,16α-dimethyl-6α,9α-difluoro-17,20; 20,21-bismethylenedioxy-Δ²,⁴-pregnadien-11β-ol. | 2,16α-dimethyl-6α,9α-difluoro-Δ²,⁴-pregnadien-11β,17α,21-triol-20-one. |
| 2,16α-dimethyl-6α-fluoro-9α-chloro-17,20; 20,21-bismethylenedioxy-Δ²,⁴-pregnadien-11β-ol. | 2,16α-dimethyl-6α-fluoro-9α-chloro-Δ²,⁴-pregnadien-11β,17α,21-triol-20-one. |
| 2,16β-dimethyl-6α,9α-difluoro-17,20; 20,21-bismethylenedioxy-Δ²,⁴-pregnadien-11β-ol. | 2,16β-dimethyl-6α,9α-difluoro-Δ²,⁴-pregnadien-11β,17α,21-triol-20-one. |
| 2,6α,16β-trimethyl-17,20; 20,21-bismethylenedioxy-Δ²,⁴-pregnadien-11β-ol. | 2,6α,16β-trimethyl-Δ²,⁴-pregnadien-11β,17α,21-triol-20-one. |
| 2-methyl-6α-chloro-9α-fluoro-17,20; 20,21-bismethylenedioxy-Δ²,⁴-pregnadien-11β,16α-diol. | 2-methyl-6α-chloro-9α-fluoro-Δ²,⁴-pregnadien-11β,16α,17α,21-tetrol-20-one. |
| 2-methyl-9α-fluoro-17,20; 20,21-bismethylenedioxy-Δ²,⁴-pregnadien-11β,16α-diol. | 2-methyl-9α-fluoro-Δ²,⁴-pregnadien-11β,16α,17α,21-tetrol-20-one. |

| Starting Compound | Product |
|---|---|
| 2,16α-dimethyl-6α-fluoro-17,20; 20,21-bismethylenedioxy-Δ²,⁴-pregnadien-11-one. | 2,16α-dimethyl-6α-fluoro-Δ²,⁴-pregnadien-17α,21-diol-11,20-dione. |
| 2,16α-dimethyl-6α-fluoro-17,20; 20,21-bismethylenedioxy-Δ²,⁴-pregnadien-11β-ol. | 2,16α-dimethyl-6α-fluoro-Δ²,⁴-pregnadien-11β,17α,21-triol-20-one. |
| 2,16α-dimethyl-6α-fluoro-9α-chloro-17,20; 20,21-bismethylenedioxy-Δ²,⁴-pregnadien-11-one. | 2,16α-dimethyl-6α-fluoro-9α-chloro-Δ²,⁴-pregnadien-17α-21-diol-11,20-dione. |
| 2,16α-dimethyl-6α,9α-difluoro-17,20; 20,21-bismethylenedioxy-Δ²,⁴-pregnadien-11-one. | 2,16α-dimethyl-6α,9α-difluoro-Δ²,⁴-pregnadien-17α,21-diol-11,20-dione. |
| 2,16β-dimethyl-6α,9α-difluoro-17,20; 20,21-bismethylenedioxy-Δ²,⁴-pregnadien-11-one. | 2,16β-dimethyl-6α,9α-difluoro-Δ²,⁴-pregnadien-17α,21-diol-11,20-dione. |
| 2,6α,16β-trimethyl-17,20; 20,21-bismethylenedioxy-Δ²,⁴-pregnadien-11-one. | 2,6α,16β-trimethyl-Δ²,⁴-pregnadien-17α,21-diol-11,20-dione. |
| 2-methyl-6α-chloro-9α-fluoro-17,20; 20,21-bismethylenedioxy-Δ²,⁴-pregnadien-16α-ol-11-one. | 2-methyl-6α-chloro-9α-fluoro-Δ²,⁴-pregnadien-16α,17α,21-triol-11,20-dione. |
| 2-methyl-9α-fluoro-17,20; 20,21-bismethylenedioxy-Δ²,⁴-pregnadien-16α-ol-11-one. | 2-methyl-9α-fluoro-Δ²,⁴-pregnadien-16α,17α,21-triol-11,20-dione. |
| 2-methyl-11,20; 20,21-bismethylenedioxy-Δ²,⁴-pregnadien-11β-ol. | 2-methyl-Δ²,⁴-pregnadien-11β,17α,21-triol-20-one. |
| 2,6α-dimethyl-17,20; 20,21-bismethylenedioxy-Δ²,⁴-pregnadien-11β,16α-diol. | 2,6α-dimethyl-Δ²,⁴-pregnadien-11β,16α,17α,21-tetrol-20-one. |

Example III

A mixture of 1 g. of 2,16α-dimethyl-6α-fluoro-Δ²-allopregnen-17α,21-diol-11,20-dione, 4 cc. of pyridine and 2 cc. of acetic anhydride was kept at room temperature overngiht, poured into ice water, the formed precipitate was filtered, washed with water and dried. Crystallization from acetone-hexane gave the 21 acetate of 2,16α-dimethyl-6α-fluoro-Δ²-allopregnen-17α,21-diol-11,20-dione.

Following the above technique were treated the starting compounds hereinafter listed, furnishing the products indicated below:

| Starting Compound | Product |
|---|---|
| 2,16α-dimethyl-6α,9α-difluoro-Δ²-allopregnen-17α,21-diol-11,20-dione. | 21-acetate of 2,16α-dimethyl-6α,9α-difluoro-Δ²-allopregnen-17α,21-diol-11,20-dione. |
| 2,16α-dimethyl-6α-fluoro-9α-chloro-Δ²-allopregnen-17α,21-diol-11,20-dione. | 21-acetate of 2,16α-dimethyl-6α-fluoro-9α-chloro-Δ²-allopregnen-17α,21-diol-11,20-dione. |
| 2,16α-dimethyl-6α-fluoro-Δ²-allopregnen-11β,17α,21-triol-20-one. | 21-acetate of 2,16α-dimethyl-6α-fluoro-Δ²-allopregnen-11β,17α,21-triol-20-one. |
| 2,16α-dimethyl-6α,9α-difluoro-Δ²-allopregnen-11β,17α,21-triol-20-one. | 21-acetate of 2,16α-dimethyl-6α,9α-difluoro-Δ²-allopregnen-11β,17α,21-triol-20-one. |
| 2,16α-dimethyl-6α-fluoro-9α-chloro-Δ²-allopregnen-11β,17α,21-triol-20-one. | 21-acetate of 2,16α-dimethyl-6α-fluoro-9α-chloro-Δ²-allopregnen-11β,17α,21-triol-20-one. |
| 2,16β-dimethyl-6α,9α-difluoro-Δ²-allopregnen-17α,21-diol-11,20-dione. | 21-acetate of 2,16β-dimethyl-6α,9α-difluoro-Δ²-allopregnen-17α,21-diol-11,20-dione. |
| 2,16β-dimethyl-6α,9α-difluoro-Δ²-allopregnen-11β,17α,21-triol-20-one. | 21-acetate of 2,16β-dimethyl-6α,9α-difluoro-Δ²-allopregnen-11β,17α,21-triol-20-one. |
| 2,6α,16β-trimethyl-Δ²-allopregnen-17α,21-diol-11,20-dione. | 21-acetate of 2,6α,16β-trimethyl-Δ²-allopregnen-17α,21-diol-11,20-dione. |
| 2,6α,16β-trimethyl-Δ²-allopregnen-11β,17α,21-triol-20-one. | 21-acetate of 2,6α,16β-trimethyl-Δ²-allopregnen-11β,17α,21-triol-20-one. |
| 2-methyl-6α-chloro-9α-fluoro-Δ²-allopregnen-16α,17α,21-triol-11,20-dione. | 16,21-diacetate of 2-methyl-6α-chloro-9α-fluoro-Δ²-allopregnen-16α,17α,21-triol-11,20-dione. |
| 2-methyl-6α-chloro-9α-fluoro-Δ²-allopregnen-11β,16α,17α,21-tetrol-20-one. | 16,21-diacetate of 2-methyl-6α-chloro-9α-fluoro-Δ²-allopregnen-11β,16α,17α,21-tetrol-20-one. |
| 2-methyl-9α-fluoro-Δ²-allopregnen-11β,16α,17α,21-tetrol-20-one. | 16,21-diacetate of 2-methyl-9α-fluoro-Δ²-allopregnen-11β,16α,17α,21-tetrol-20-one. |
| 2-methyl-9α-fluoro-Δ²-allopregnen-16α,17α,21-triol-11,20-dione. | 16,21-diacetate of 2-methyl-9α-fluoro-Δ²-allopregnen-16α,17α,21-triol-11,20-dione. |
| 2-methyl-Δ²-allopregnen-11β,17α,21-triol-20-one. | 21-acetate of 2-methyl-Δ²-allopregnen-11β,17α,21-triol-20-one. |
| 2,6α-dimethyl-Δ²-allopregnen-11β,16α,17α,21-tetrol-20-one. | 16,21-diacetate of 2,6α-dimethyl-Δ²-allopregnen-11β,16α,17α,21-tetrol-20-one. |
| 2,16α-dimethyl-6α,9α-difluoro-Δ²,⁴-pregnadien-11β,17α,21-triol-20-one. | 21-acetate of 2,16α-dimethyl-6α,9α-difluoro-Δ²,⁴-pregnadien-11β,17α,21-triol-20-one. |
| 2,16α-dimethyl-6α-fluoro-9α-chloro-Δ²,⁴-pregnadien-11β,17α,21-triol-20-one. | 21-acetate of 2,16α-dimethyl-6α-fluoro-9α-chloro-Δ²,⁴-pregnadien-11β,17α,21-triol-20-one. |
| 2,16β-dimethyl-6α,9α-difluoro-Δ²,⁴-pregnadien-11β,17α,21-triol-20-one. | 21-acetate of 2,16β-dimethyl-6α,9α-difluoro-Δ²,⁴-pregnadien-11β,17α,21-triol-20-one. |
| 2,6α,16β-trimethyl-Δ²,⁴-pregnadien-11β,17α,21-triol-20-one. | 21-acetate of 2,6α,16β-trimethyl-Δ²,⁴-pregnadien-11β,17α,21-triol-20-one. |
| 2-methyl-6α-chloro-9α-fluoro-Δ²,⁴-pregnadien-11β,16α,17α,21-tetrol-20-one. | 16,21-diacetate of 2-methyl-6α-chloro-9α-fluoro-Δ²,⁴-pregnadien-11β,16α,17α,21-tetrol-20-one. |
| 2-methyl-9α-fluoro-Δ²,⁴-pregnadien-11β,16α,17α,21-tetrol-20-one. | 16,21-diacetate of 2-methyl-9α-fluoro-Δ²,⁴-pregnadien-11β,16α,17α,21-tetrol-20-one. |
| 2,16α-dimethyl-6α-fluoro-Δ²,⁴-pregnadien-17α,21-diol-11,20-dione. | 21-acetate of 2,16α-dimethyl-6α-fluoro-Δ²,⁴-pregnadien-17α,21-diol-11,20-dione. |
| 2,16α-dimethyl-6α-fluoro-Δ²,⁴-pregnadien-11β,17α,21-triol-20-one. | 21-acetate of 2,16α-dimethyl-6α-fluoro-Δ²,⁴-pregnadien-11β,17α,21-triol-20-one. |
| 2,16α-dimethyl-6α-fluoro-9α-chloro-Δ²,⁴-pregadien-17α,21-diol-11,20-dione. | 21-acetate of 2,16α-dimethyl-6α-fluoro-9α-chloro-Δ²,⁴-pregnadien-17α,21-diol-11,20-dione. |
| 2,16α-dimethyl-6α,9α-difluoro-Δ²,⁴-pregnadien-17α,21-diol-11,20-dione. | 21-acetate of 2,16α-dimethyl-6α,9α-difluoro-Δ²,⁴-pregnadien-17α,21-diol-11,20-dione. |
| 2,16β-dimethyl-6α,9α-difluoro-Δ²,⁴-pregnadien-17α,21-diol-11,20-dione. | 21-acetate of 2,16β-dimethyl-6α,9α-difluoro-Δ²,⁴-pregnadien-17α,21-diol-11,20-dione. |
| 2,6α,16β-trimethyl-Δ²,⁴-pregnadien-17α,21-diol-11,20-dione. | 21-acetate of 2,6α,16β-trimethyl-Δ²,⁴-pregnadien-17α,21-diol-11,20-dione. |
| 2-methyl-6α-chloro-9α-fluoro-Δ²,⁴-pregnadien-16α,17α,21-triol-11,20-dione. | 16,21-diacetate of 2-methyl-6α-chloro-9α-fluoro-Δ²,⁴-pregnadien-16α,17α,21-triol-11,20-dione. |
| 2-methyl-9α-fluoro-Δ²,⁴-pregnadien-16α,17α,21-triol-11,20-dione. | 16,21-diacetate of 2-methyl-9α-fluoro-Δ²,⁴-pregnadien-16α,17α,21-triol-11,20-dione. |
| 2-methyl-Δ²,⁴-pregnadien-11β,17α,21-triol-20-one. | 21-acetate of 2-methyl-Δ²,⁴-pregnadien-11β,17α,21-triol-20-one. |
| 2,6α-dimethyl-Δ²,⁴-pregnadien-11β,16α,17α,21-tetrol-20-one. | 16,21-diacetate of 2,6α-dimethyl-Δ²,⁴-pregnadien-11β,16α,17α,21-tetrol-20-one. |

Following the above described procedure, but substituting acetic anhydride by propionic anhydride, caproic anhydride, cyclopentylpropionic anhydride and benzoyl chloride, there were correspondingly obtained the propionates, caproates, cyclopentylpropionates and benzoates of the hereinabove listed starting compounds.

Example IV

To 120 cc. of acetone containing 1 g. of 2-methyl-6α-chloro-9α-fluoro-Δ²-allopregnene-16α,17α,21-triol-11,20-dione, prepared in Example II, were added 30 drops of 78% perchloric acid. After one hour at room temperature, 30 drops of pyridine were added and the resulting solution was evaported to dryness under reduced pressure. 30 cc. of water were then added to the residue and it was then extracted several times with 80 cc. of ethyl acetate. The combined extracts were washed to neutrality with water, dried over sodium sulfate and evaporated to dryness. The residue upon trituration with methanol gave a crude 16,17-acetonide. Recrystallizations from the same solvent afforded the 16,17-acetonide of 2-methyl-6α-chloro-9α-fluoro-Δ²-allopregnene-16α,17α,21-triol-11,20-dione.

By following the same procedures, there were treated the starting products listed below and there were obtained the corresponding 16,17-acetonide products hereinafter listed:

| Starting Compound | Final Product |
|---|---|
| 2-methyl-6α-chloro-9α-fluoro-Δ²-allopregnene-11β,16α,17α,21-tetrol-20-one. | The acetonide of 2-methyl-6α-chloro-9α-fluoro-Δ²-allopregnene-11β,16α,17α,21-tetrol-20-one. |
| 2-methyl-9α-fluoro-Δ²-allopregnene-11β,16α,17α,21-tetrol-20-one. | The acetonide of 2-methyl-9α-fluoro-Δ²-allopregnene-11β,16α,17α,21-tetrol-20-one. |
| 2-methyl-9α-fluoro-Δ²-allopregnen-16α,17α,21-triol-11,20-dione. | The acetonide of 2-methyl-9α-fluoro-Δ²-allopregnene-16α,17α,21-triol-11,20-dione. |
| 2-methyl-9α-fluoro-Δ²,⁴-pregnadiene-11β,16α,17α,21-tetrol-20-one. | The acetonide of 2-methyl-9α-fluoro-Δ²,⁴-pregnadiene-11β,16α,17α,21-tetrol-20-one. |
| 2-methyl-6α-chloro-9α-fluoro-Δ²,⁴-pregnadiene-11β,16α,17α,21-tetrol-20-one. | The acetonide of 2-methyl-6α-chloro-9α-fluoro-Δ²,⁴-pregnadiene-11β,16α,17α,21-tetrol-20-one. |
| 2-methyl-6α-chloro-9α-fluoro-Δ²,⁴-pregnadiene-16α,17α,21-triol-11,20-dione. | The acetonide of 2-methyl-6α-chloro-9α-fluoro-Δ²,⁴-pregnadiene-16α,17α,21-triol-11,20-dione. |

| Starting Compound | Final Product |
|---|---|
| 2-methyl-9α-fluoro-Δ²,⁴-pregnadiene-16α,17α,21-triol-11,20-dione. | The acetonide of 2-methyl-9α-fluoro-Δ²,⁴-pregnadiene-16α,17α,21-triol-11,20-dione. |
| 2,6α-dimethyl-Δ²-allopregnene-11β,16α,17α,21-tetrol-20-one. | The acetonide of 2,6α-dimethyl-Δ²-allopregnene-11β,16α,17α,21-tetrol-20-one. |
| 2,6α-dimethyl-Δ²,⁴-pregnadiene-11β,16α,17α,21-tetrol-20-one. | The acetonide of 2,6α-dimethyl-Δ²,⁴-pregnadiene-11β,16α,17α,21-tetrol-20-one. |

Example V

By following the procedure described in Example IV except that acetone was substituted by benzaldehyde, paraformaldehyde and cyclohexanone, there were obtained respectively the corresponding 16α,17α-benzylidenedioxy, 16α, 17α-methylenedioxy and 16α,17α-cyclohexanone ketal derivatives of the starting compounds of Example IV.

Example VI

The final products described in Examples IV and V were transformed into the corresponding 21-acetates, 21-propionates, 21-caproates, 21-cyclopentylpropionates and 21-benzoates in accordance with the methods described in Example III.

We claim:
1. A compound of the following formula:

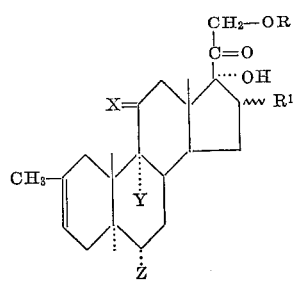

wherein R is selected from the group consisting of hydrogen and a hydrocarbon carboxylic acyl group of less than 12 carbon atoms; $R^1$ is a member of the group consisting of hydrogen, α-methyl, β-methyl, α-hydroxyl and an α-acyloxy group derived from a hydrocarbon carboxylic acid of less than 12 carbon atoms; X is selected from the group consisting of β-hydroxyl and keto; Y is a member of the group consisting of hydrogen, fluorine and chlorine and Z is selected from the group consisting of hydrogen, fluorine, chlorine and methyl.

2. 2,16α-dimethyl - 6α - fluoro-Δ²-allopregnen-17α,21-diol-11,20-dione.
3. 2,16α-dimethyl - 6α - fluoro-9α-chloro-Δ²-allopregnen-17α,21-diol-11,20-dione.
4. 2,16α-dimethyl - 6α,9α - difluoro-Δ²-allopregnen-17α,21-diol-11,20-dione.
5. 2,16 -dimethyl - 6α,9α - difluoro-Δ²-allopregnen-11β,17α,21-triol-20-one.
6. 2,16α-dimethyl - 6α - fluoro-Δ²-allopregnen-11β,17α,21-triol-20-one.
7. 2,16β-dimethyl - 6α,9α-difluoro-Δ²-allopregnen-11β,17β,21-triol-20-one.
8. 2,16β-dimethyl - 6α,9α-difluoro-Δ²-allopregnen-17α,21-diol-11,20-dione.
9. 2,6α,16β-trimethyl - Δ² - allopregnen-17α,21-diol-11,20-dione.
10. 2,6α,16β-trimethyl - Δ² - allopregnen-11β,17α,21-triol-20-one.
11. 2-methyl-6α-chloro-9α-fluoro - Δ²-allopregnen-16α,17α,21-triol-11,20-dione.
12. 2-methyl-6α-chloro-9α-fluoro - Δ²-allopregnen-11β,16α,17α,21-tetrol-20-one.

13. A compound of the following formula:

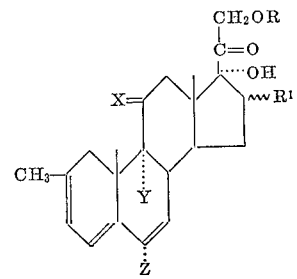

wherein R is selected from the group consisting of hydrogen and a hydrocarbon carboxylic acyl group of less than 12 carbon atoms; $R^1$ is a member of the group consisting of hydrogen, α-methyl, β-methyl, α-hydroxyl and an α-acyloxy group derived from a hydrocarbon carboxylic acid of less than 12 carbon atoms; X is selected from the group consisting of β-hydroxyl and keto; Y is a member of the group consisting of hydrogen, fluorine and chlorine and Z is selected from the group consisting of hydrogen, fluorine, chlorine and methyl.

14. 2,16α-dimethyl-6α-fluoro - Δ²,⁴-pregnadien-17α,21-diol-11,20-dione.
15. 2,16α-dimethyl-6α-fluoro-9α-chloro - Δ²,⁴-pregnadien-17α,21-diol-11,20-dione.
16. 2,16α-dimethyl-6α,9α-difluoro - Δ²,⁴ - pregnadien-17α,21-diol-11,20-dione.
17. 2,16α-dimethyl-6α,9α - Δ²ˣ⁴ - pregnadien-11β,17α,21-triol-20-one.
18. 2,16α-dimethyl-6α-fluoro-9α-chloro - Δ²,⁴-pregnadien-11β,17α,21-triol-20-one.
19. 2,16β-dimethyl-6α,9α-difluoro - Δ²,⁴ - pregnadien-11β,17α-triol-20-one.
20. 2,16β-dimethyl-6α,9α-difluoro - Δ²,⁴ - pregnadien-17α,21-diol-11,20-dione.
21. 2,6α,16β-trimethyl-Δ²,⁴-pregnadien - 17α,21-diol-11,20-dione.
22. 2,6α,16β-trimethyl - Δ²,⁴ - pregnadien-11β,17α,21-triol-20-one.
23. 2-methyl-6α-chloro-9α-fluoro - Δ²,⁴ - pregnadien-16α,17α,21-triol-11,20-dione.
24. 2-methyl-6α-chloro-9α-fluoro - Δ²,⁴ - pregnadien-11β,16α,17α,21-tetrol-20-one.
25. A compound of the following formula:

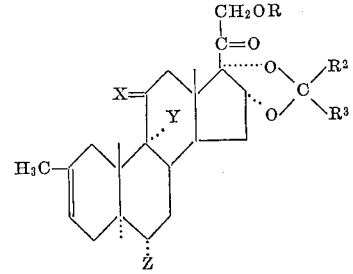

wherein X is selected from the group consisting of β-hydroxyl and keto; Y is a member of the group consisting of hydrogen, fluorine and chlorine; Z is selected from the group consisting of hydrogen, fluorine, chlorine and methyl; R is selected from the group consisting of hydrogen and a hydrocarbon carboxylic acyl group of less than 12 carbon atoms; and $R^2$ and $R^3$ are each selected from the group consisting of hydrogen and a hydrocarbon radical containing up to 8 carbon atoms.

26. A compound of the following formula:

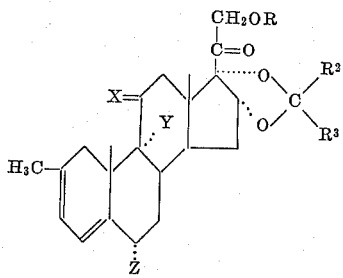

wherein X is selected from the group consisting of β-hydroxyl and keto; Y is a member of the group consisting of hydrogen, fluorine and chlorine; Z is selected from the group consisting of hydrogen, fluorine, chlorine and methyl; is selected from the group consisting of hydrogen and a hydrocarbon carboxylic acyl group of less than 12 carbon atoms; and $R^2$ and $R^3$ are each selected from the group consisting of hydrogen and a hydrocarbon radical containing up to 8 carbon atoms.

References Cited

UNITED STATES PATENTS

| | | | |
|---|---|---|---|
| 3,056,814 | 10/1962 | Bowers et al. | 260—397.45 |
| 3,082,220 | 3/1963 | Bowers et al. | 260—397.3 |
| 3,086,013 | 4/1963 | Bowers et al. | 260—239.55 |

FOREIGN PATENTS

| | | |
|---|---|---|
| 834,926 | 5/1960 | Great Britain. |
| 838,228 | 6/1960 | Great Britain. |

OTHER REFERENCES

Fieser et al., Steroids, pp. 692–696 (1959), Reinhold Pub. Co., New York, N.Y.

LEWIS GOTTS, *Primary Examiner.*

MORRIS LIEBERMAN, *Examiner.*

G. E. LANDE, H. FRENCH, E. L. ORBERTS,
*Assistant Examiners.*

UNITED STATES PATENT OFFICE
CERTIFICATE OF CORRECTION

Patent No. 3,341,524                 September 12, 1967

Albert Bowers et al.

It is hereby certified that error appears in the above numbered patent requiring correction and that the said Letters Patent should read as corrected below.

Column 8, line 34, for "$6\alpha,9\alpha-\Delta^{2\times 4}$" read -- $6\alpha,9\alpha$-difluoro-$\Delta^{2,4}$ --; column 9, lines 19 and 20, for "methyl; is" read -- methyl; R is --.

Signed and sealed this 21st day of January 1969.

(SEAL)
Attest:

Edward M. Fletcher, Jr.            EDWARD J. BRENNER
Attesting Officer                Commissioner of Patents